United States Patent

Thomas et al.

[11] Patent Number: 6,042,326
[45] Date of Patent: Mar. 28, 2000

[54] GRAIN CART DRIVE ASSEMBLY

[75] Inventors: Dean Thomas; Darren Borstmayer, both of St. Brieux, Canada; Ronald Allan, Leeming, Australia

[73] Assignee: Bourgault Industries Ltd., St. Brieux, Canada

[21] Appl. No.: 09/116,838

[22] Filed: Jul. 16, 1998

[30] Foreign Application Priority Data

Jun. 17, 1998 [CA] Canada ................................. 2240869

[51] Int. Cl.$^7$ .................................................... B60P 1/40
[52] U.S. Cl. ......................... 414/502; 414/505; 414/526; 198/674
[58] Field of Search .................................. 414/502, 503, 414/505, 526; 198/668, 670, 674, 675

[56] References Cited

U.S. PATENT DOCUMENTS

| | | | |
|---|---|---|---|
| 2,431,000 | 11/1947 | Step | 414/505 |
| 2,479,899 | 8/1949 | Beyer | 414/505 |
| 2,730,256 | 1/1956 | Louden et al. | 414/505 |
| 2,883,076 | 4/1959 | Palmer | 414/502 X |
| 3,286,862 | 11/1966 | Hansen | 414/502 |
| 4,274,790 | 6/1981 | Barker | 414/505 X |
| 4,381,165 | 4/1983 | James et al. | 414/526 |
| 4,572,356 | 2/1986 | Janick | 198/674 X |
| 5,584,640 | 12/1996 | Johnson | 414/502 |
| 5,733,094 | 3/1998 | Bergkamp et al. | 414/502 X |

*Primary Examiner*—James W. Keenan
*Attorney, Agent, or Firm*—Jones, Day, Reavis & Pogue

[57] ABSTRACT

In a grain cart equipped with a lower horizontally-disposed input drag auger, a vertically disposed lift auger, and an upper horizontally disposed discharge auger, a unique drive train is used. The lift auger and the discharge auger can be activated independently of the input auger in order to empty their contents on start-up of the grain cart discharge system. By so doing the strain on the drive train is considerably lessened thus permitting very large grain carts to be emptied without damage to the drive train system. A hydraulic cylinder activates a belt-tightener between a drive sheave and a driven sheave. The driven sheave is attached to the axis of the drag auger. When the hydraulic cylinder is extended, pressure exerted on the belt causes the input auger to rotate and to feed the lift and discharge augers.

1 Claim, 5 Drawing Sheets

GRAIN CART DRIVE ASSEMBLY

DISCLOSURE

1. Field of Invention

This invention relates to grain carts and in particular a grain cart drive assembly.

2. Background

Modern grain carts are used for a multitude of tasks, however, the main function is during the harvest of the grain to transport the harvested grain from the combines to grain trucks or bins at the side of the field.

As farm operations become more and more capital intensive and less labour intensive the machinery used, in particular grain farm operations, becomes larger in order that three or four men can successfully farm up to ten sections. In order to accomplish this, combines, grain trucks and other harvesting implements have become proportionately larger to transport large amounts of grain. New grain carts have much greater capacity than earlier grain carts, however, the drive components are still activated by motor vehicles, such as tractors.

The motorized vehicle's power take-off shaft is connected to a power drive shaft of the grain cart. The power from the motor vehicle's power take-off shaft is transmitted through a series of shafts and universal joints into gear boxes. The grain cart includes a lower horizontally disposed drag auger which is located on the bottom of the grain bin of the cart. This auger drags grain and propels it into a vertically disposed lift auger. This second auger lifts the grain from the drag auger's output portion upwardly to a horizontally disposed output turret auger. The output auger then moves the grain horizontally to its discharge end. The output auger is mounted to the upper end of the vertically disposed lift auger by means of a turret, which is capable of rotating. Thus, grain can be discharged on either side of the grain cart to a waiting truck or bin.

Because of the large mass of the grain in the three augers, start-up by the power take-off of the tractor causes a great strain on the drive system and often results in breakage of the various chains, sprockets or gears used to transmit power from the power take-off to the augers.

The inventors of the present invention have found that if the vertical lift auger and the horizontal discharge auger are emptied of their contents independently of the drag auger during start-up, the amount of strain when the drag auger is activated is considerably less and little breakage occurs.

It is therefore an object of the present invention to create a drive assembly for the augers of the grain cart wherein the vertical and output augers can be activated independently of the drag auger.

SUMMARY OF INVENTION

Therefore, this invention seeks to provide a grain cart drive assembly for use with a grain cart;

said grain cart including a lower horizontally disposed grain input auger;

a vertically disposed grain lift auger; and an upper horizontally disposed turret output auger;

said lift auger and said output auger being connected by an upper gear box such that in operation both rotate together;

said lift auger being connected at its lower end to a lower gear box;

said lower gear box being in direct communication to the drive shaft connected to a power source;

said grain cart further including a drive sheave fixedly mounted to an input shaft of said lower gear box;

a driven sheave fixedly mounted to an input shaft of said input auger; and an endless belt mounted on said sheaves;

said endless belt being adopted to be tightened or loosened in operation by a tightener arm assembly thereby respectively activating or deactivating said input auger.

The grain cart of the present invention has a three-auger system, a lower horizontally disposed drag auger at the bottom of the cart, a vertically disposed lift anchor which is adapted to take grain from the output end of the input auger and a horizontally disposed turret discharge auger.

The drive system of the present invention is the simplest arrangement for delivering grain and controlling the sequence of operations. The power take-off shaft of a towing vehicle, such as a tractor, is coupled to a drive shaft through universal joints to a lower 90 degree gear box which in turn drives a vertical auger. At the outboard end of the vertical auger is a second 90 degree gear box coupled to a horizontally-disposed turret output auger.

A drive sheave is mounted on the input shaft of the bottom gear box. A driven sheave is mounted on the axle of the drag auger. A belt connects the two sheaves and a hydraulic cylinder connected to a spring loaded tightener provides sufficient friction between the belt and the sheaves to transmit power to the drag auger. With this arrangement the vertical auger and the output auger can be activated independently of the drag auger. This allows the vertical auger and output auger to be emptied without emptying the grain cart. This greatly reduces the force required to start-up the augers.

BRIEF DESCRIPTION OF THE DRAWINGS

The invention will be described in greater detail in connection with the following drawings wherein.

DETAILED DESCRIPTION OF THE INVENTION

Figure 1:
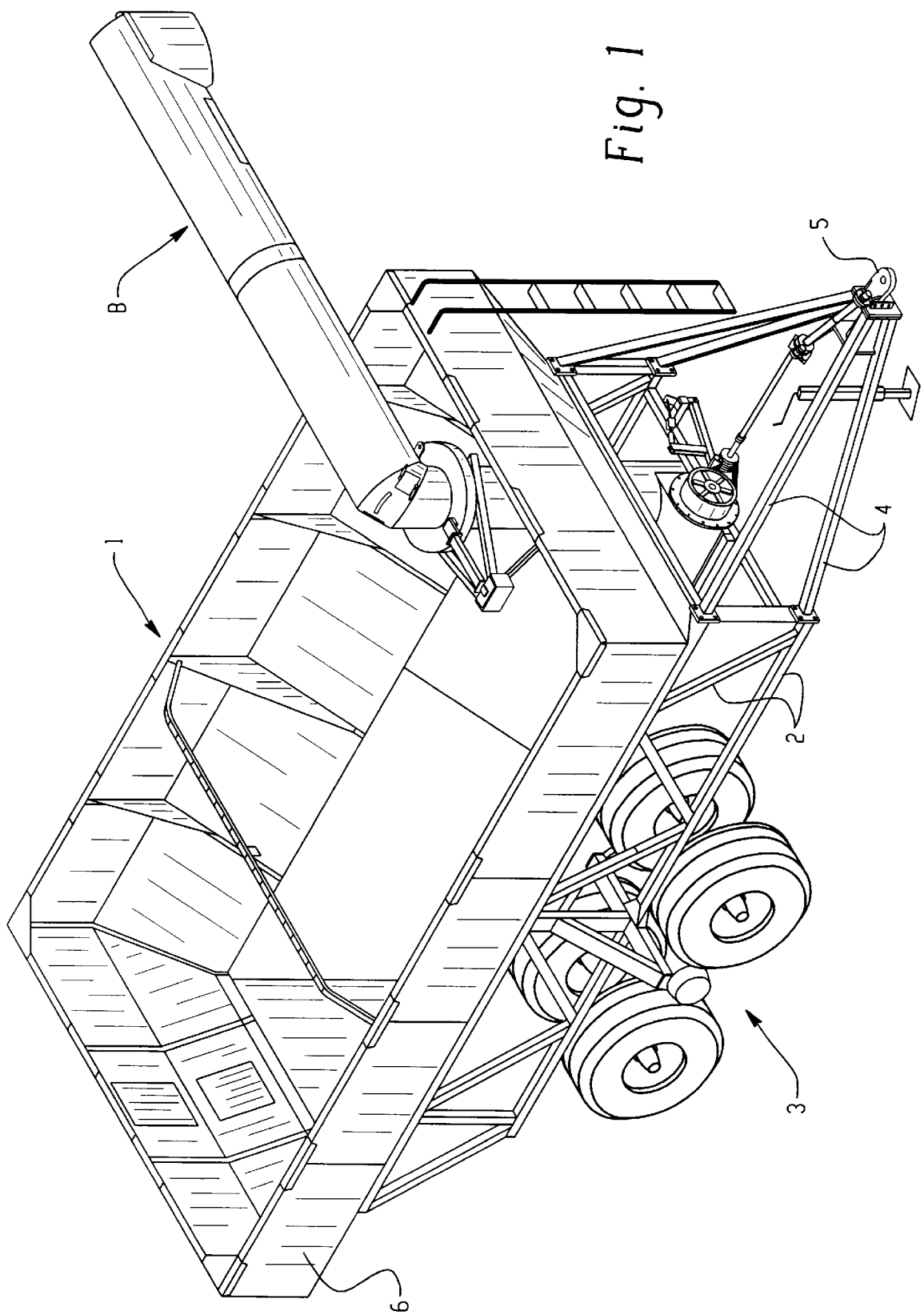
FIG. 1 is a perspective view of grain cart.

FIG. 1, illustrates the grain cart (1) of the present invention. It has a frame (2) which is supported by wheel assemblies (3). The frame (2) has a front hitch (4) and a hitch tongue (5) which is adapted to connect to a power source such as a tractor. The grain cart (1) has a large bin or hopper (6) for grain discharged by a combine. In FIG. 1 an upper output auger is shown in position B i.e. extending outwardly for discharge to a neighbouring truck or bin (not shown).

Figure 2:
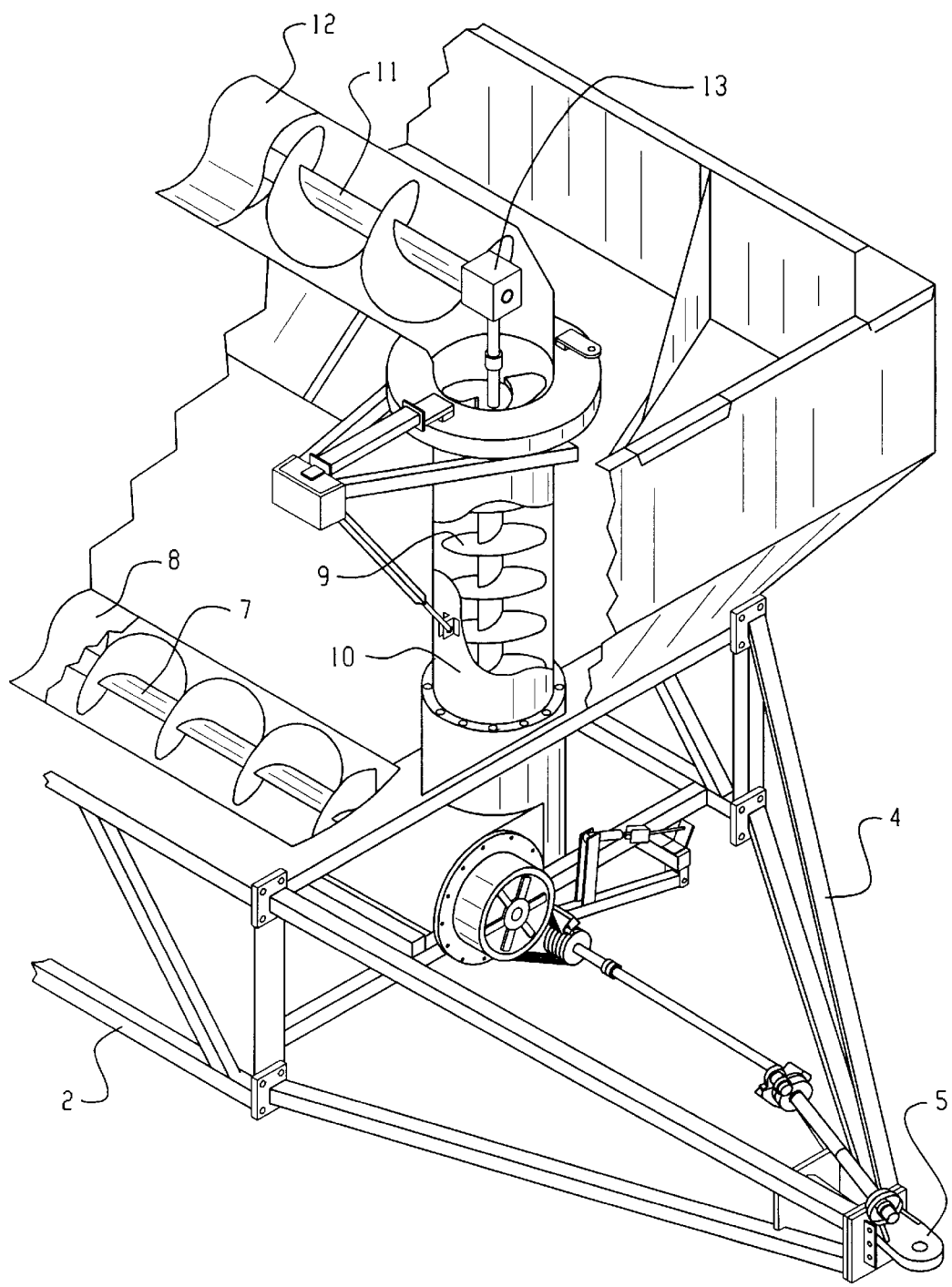
FIG. 2 is a front perspective view of the grain cart with a portion of the auger housings and a portion of the grain cart bin cut away.

In FIG. 2, one notes that there is a lower horizontally disposed drag or input auger (7) within a housing (8). Mounted beside it and vertically disposed is a lift auger (9) within a lift auger housing (10). Finally, there is an upper horizontally disposed turret output auger (11) which is located in an auger housing (12). An upper gear box (13) transmits power from the vertical auger (9) to the horizontal turret auger (11). Thus, both the vertical lift auger (9) and horizontal turret auger (11) rotate together.

Figure 4:
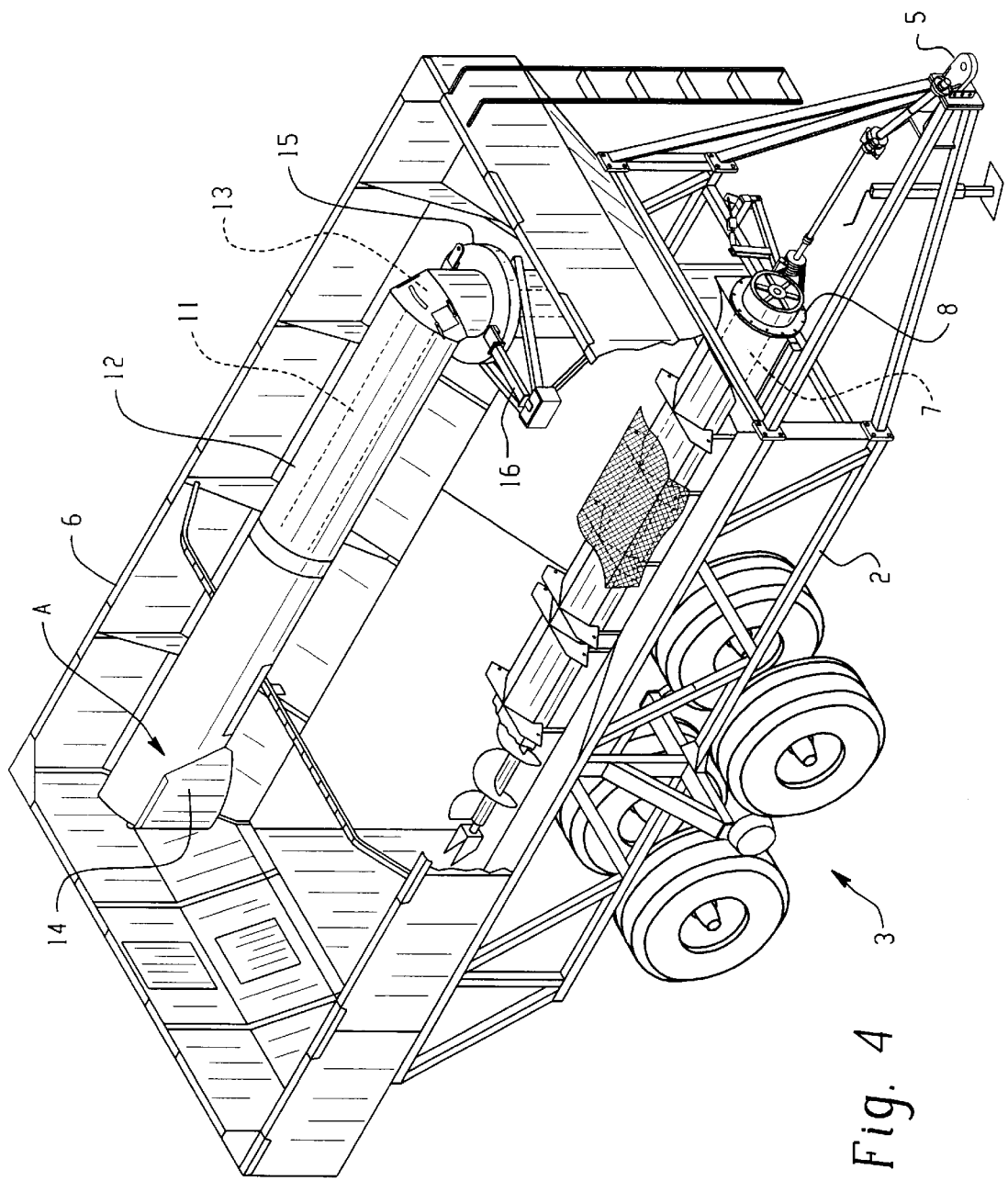
FIG. 4 is a view of the grain cart showing the horizontal output auger in the inward position.

As shown in FIG. 4 the upper horizontally disposed turret auger (11) has an outlet spout (14). The horizontally-disposed turret auger (11) is mounted for rotation on a turret auger support bearing system (15). This is activated by a hydraulic cylinder (16) and permits the turret auger (11) to discharge on either side of the grain cart. To discharge on either side some manipulation of the hydraulic cylinder relative to the turret is required. The hydraulic cylinder has to be connected to a different tab on the auger housing depending on which side the operator wants to unload.

Figure 3:
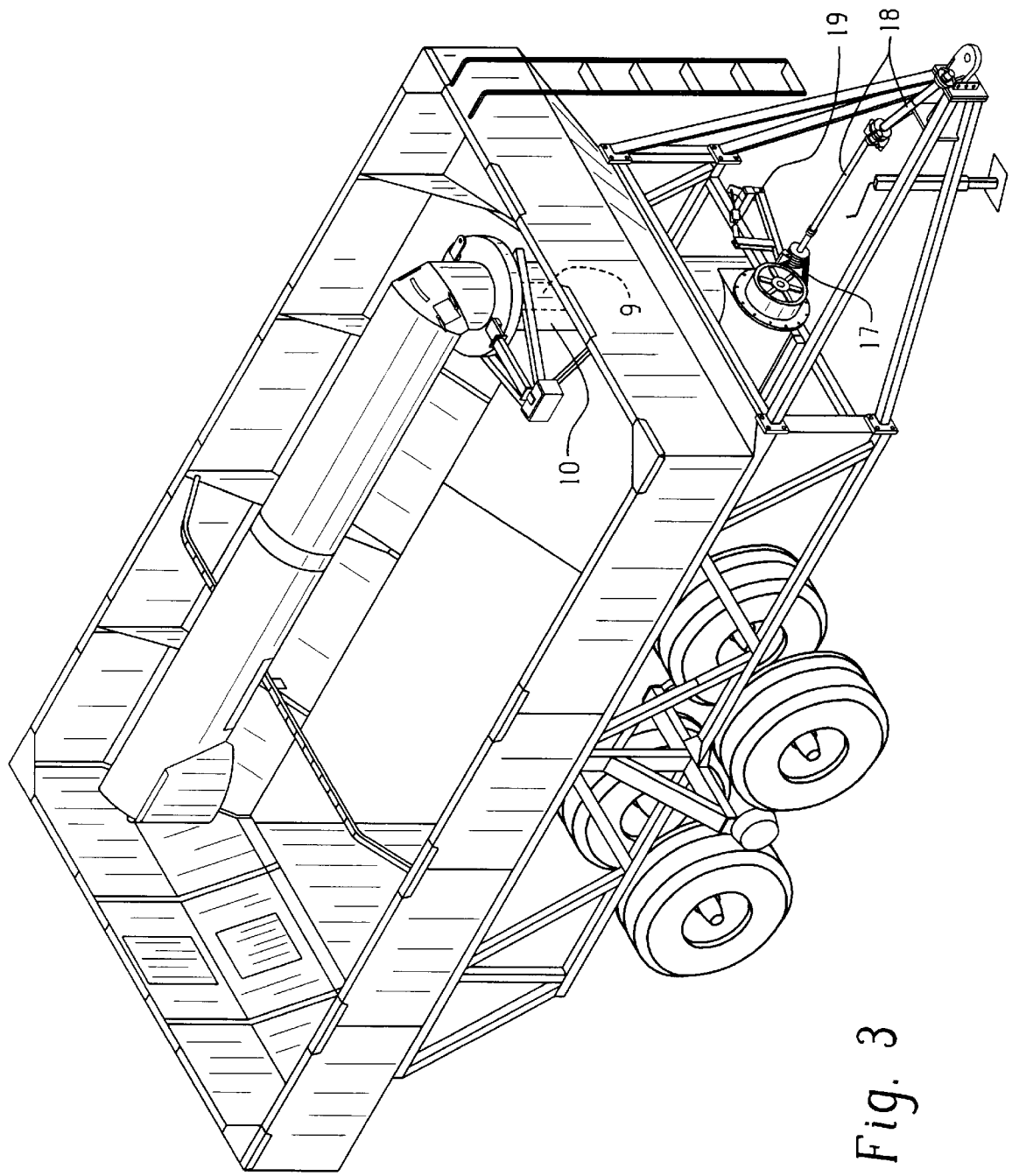
FIG. 3 is an expanded view of the drive system.

In FIG. 3, are found the major components of the drive assembly. These consist of a drive assembly (18), a drag auger actuator (17) and a tightener arm assembly (19).

Figure 5:
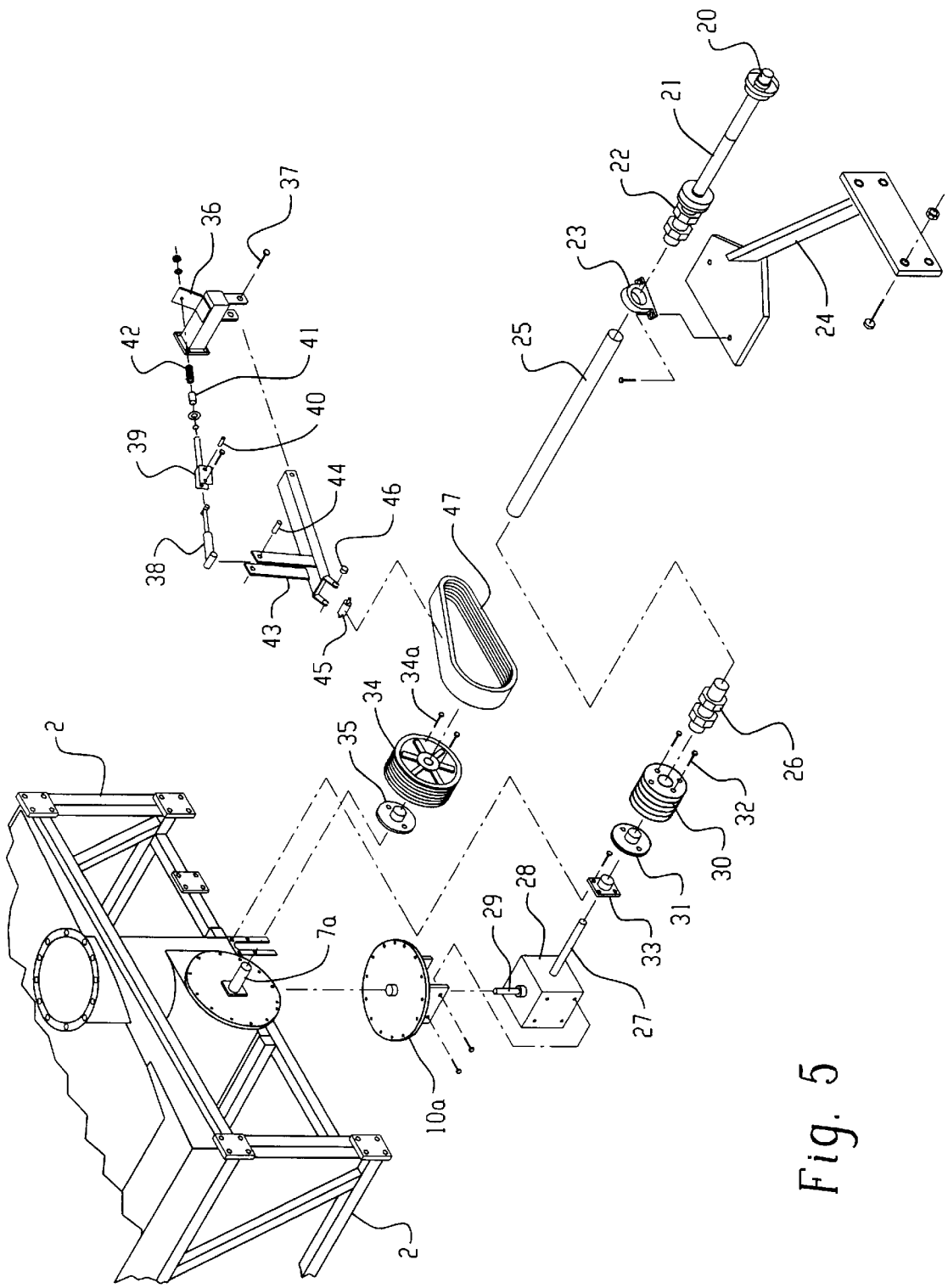
FIG. 5 is an exploded view of the components of the drive system.

FIG. 5 is an exploded view of the components of the drive, tightener, and drag auger actuator assemblies. A first universal joint (20) is adapted to attach to the power take-off of a tractor near the hitch tongue (5). This joint is connected to a first power shaft (21) and to a second universal joint (22). Bearing (23) supports the second power shaft (25). Bearing (23) rests on a power shaft mount assembly (24).

A second power shaft (25) is connected to a third universal joint (26) which is connected to the input shaft (27) of lower gear box (28). The output shaft (29) of lower gear box (28) is adapted to pass through the bottom plate (10a) of the vertical auger housing (10) and is connected to the shaft of vertical lift auger (9). Mounted on input shaft (27) of lower gear box (28) is a drive sheave (30) which is attached to mounting collar (31) by bolts (32). Support bearing (33) supports the input shaft (27). Mounting collar (31) attaches via friction to shaft (27) to drive sheave (30). Bearing (33) and collar (31) are both on shaft (27) however, are not connected. A driven sheave (34) fits on a mounted collar (35) on shaft (7a) of lower drag auger (7). The driven sheave (34) is affixed to the mounting collar (35) by means of bolts (34a). The tightener assembly includes a tightener arm mounting bracket (36) which is mounted to the grain cart frame (2). Bolt (37) is used as a point of rotation for the tightener arm (43).

Hydraulic cylinder (38) is attached at one end to spring rod (39) by a pin (40). A spacer (41) fits through spring (42) and the spring rod (39) is attached at one end to the tightener arm or mounting bracket (36). The opposite end of hydraulic cylinder (38) is pivotally attached by pin (44) to tightener arm (43). Tightener arm (43) holds a tightener roller (45) between its claw shaped ends. Bearing (46) permits tightener roller (45) to turn without wear. Tightener roller (45) is adapted to put pressure on drive belt (47) in order to produce enough friction for drive sheave (30) to activate driven sheave (34).

In operation the hydraulic cylinder (38) is normally in a retracted position for start-up. Thus, when the power take-off of the vehicle is activated the first and second power shafts, universal joints, and the lower gear box (28) rotate. Accordingly, the vertically disposed lift auger (9) rotates along with the output auger (11). This will permit the lift auger (9) and the output auger (11) to be emptied completely of seed or grain without having to empty the grain cart. Once augers (9) and (11) have been emptied, the hydraulic cylinder (38) is activated and its piston rod extends causing tightener arm (43) to move downwardly and roller (45) to exert pressure on drive belt (47). In this manner drive belt (47) makes a frictionally tight fit about driven sheave (34) and drive sheave (30) causing the drag auger to rotate. This drags in grain which is transmitted to the lift auger and the output auger for discharge of grain cart's contents.

As can be seen from the foregoing, the ability to operate the lift and discharge augers (9) and (11) respectively independently of the drag auger (7) reduces strain on the drive system particularly during start-up. Thus, the present invention greatly increases the life of the drive train components.

We claim:

1. A grain cart drive assembly for use with a grain cart, said grain cart drive assembly including:

a lower horizontally disposed grain input auger;

a vertically disposed grain lift auger; and an upper horizontally disposed output auger;

said lift auger and said output auger being connected by an upper gear box such that in operation both rotate together;

said lift auger being connected at its lower end to a lower gear box;

said lower gear box being in direct communication with a drive shaft connected to a power source;

said grain cart drive assembly further including a drive sheave fixedly mounted to an input shaft of said lower gear box;

a driven sheave fixedly mounted to a shaft of said input auger; and an endless belt is mounted for movement about said sheaves;

said endless belt being adapted to be tightened or loosened in operation by a tightener arm assembly;

wherein said tightener arm assembly includes:

a tightener arm with a roller rotatably mounted on a first end thereof;

a hydraulic cylinder pivotally mounted to a second end of said tightener arm; said hydraulic cylinder being pivotally mounted at its opposite end to a spring rod; said spring rod being mounted to a tightening arm mounting bracket;

said tightener arm further being pivotally mounted at a third end to said tightener arm mounting bracket, wherein in operation, when said hydraulic cylinder is activated it exerts downward pressure on said roller which exerts force on said endless belt thereby causing said input auger to rotate; and when said hydraulic cylinder is deactivated, said input auger ceases to rotate such that said lift and output augers can operate independently of said input auger.

* * * * *